United States Patent Office 3,439,068
Patented Apr. 15, 1969

3,439,068
PROCESS FOR STABILIZING A POLYOL PHOSPHORUS BY ADDING LIMONENE DIOXIDE, VINYLCYCLOHEXENE DIOXIDE OR DICYCLODIEPOXY CARBOXYLATE AND COMPOSITION
Harry E. Hill, Wallingford, and Donald W. Kaiser, Hamden, Conn., assignors to Olin Mathieson Chemical Corporation, a corporation of Virginia
No Drawing. Filed May 21, 1965, Ser. No. 457,830
Int. Cl. C07f *9/08;* C08g *22/08;* C08k *1/60*
U.S. Cl. 260—928         8 Claims

ABSTRACT OF THE DISCLOSURE

Polyethers are prepared by reacting a concentrated phosphoric acid compostion with an organic hydroxy compound containing between about 3 and 10 hydroxyls in the presence of a solvent, reacting the resulting reaction product with an alkylene oxide to effect oxyalkylation thereof. Excess solvent and excess alkylene oxide are separated from the oxyalkylated phosphorus compound. A stabilizing proportion of an epoxide selected from the group consisting of limonene dioxide, vinylcyclohexene dioxide, dicyclodiepoxy carboxylate, and mixtures thereof, is admixed with the oxyalkylated phosphorus compound to permit storage for extended periods. The resulting oxyalkylated phosphorus compound is reacted with an organic isocyanate in the presence of a foaming agent and a catalyst to yield a urethane foam having flame resisting properties.

---

This invention relates to oxyalkylated phosphorus compounds and their use in the preparation of polyurethane foams.

Urethane foams have been employed in a wide variety of applications. Rigid urethane foams have been used extensively as insulation material in the preparation of structural members in the building trade, as insulation in refrigerators, freezers and the like, and for other insulating purposes. Flexible urethane foams have also been used extensively as upholstering material in the preparation of cushions, pillows and the like, as well as in the preparation of mattresses and mattress liners.

There is a great need at the present time for urethane foams which are substantially flame resistant. Although it is generally recognized that the presence of high proportions of nitrogen, phosphorus and/or chlorine atoms enhances the flame resistance of urethane foams, present techniques for incorporating these components in urethane foams are not entirely satisfactory.

Various processes have been employed to prepare urethane foams utilizing oxyalkylated phosphoric acid or an oxyalkylated phosphoric acid ester as a reactant. One problem encountered in such processes is that the relatively large proportion of water present in commercial phosphoric acids having $H_3PO_4$ concentrations up to about 85 percent by weight is retained in oxyalkylated form the the resulting polyol polyether, and frequently imparts undesirable properties to the resulting urethane foam. Another problem encountered in such processes is that the viscosity of the reaction mass, when preparing oxyalkylated phosphorus compounds, may be so high that the reaction is extremely difficult to complete, and uniformity of the product is not easily obtained. A further problem encountered in such processes is that the stability of the oxyalkylated phosphorus compound is adversely affected after extended storage periods due to the presence of various impurities. Such deteriorated oxyalkylated phosphorus compounds may produce urethane foams having undesirable properties.

It is a primary object of this invention to overcome the disadvantages inherent in previously known techniques for preparing oxyalklated phosphorus compounds.

Another object of the invention is to provide new oxyalkylated phosphorus compounds.

Still another object of the invention is to provide an improved process for preparing oxyalkylated phosphorus compounds.

It is another object of the invention to produce a process for controlling the viscosity of the reaction mass when preparing oxyalkylated phosphorus compounds.

Another object of the invention is to provide a process for stabilizing oxyalkylated phosphorus compounds.

A further object of the invention is to provide novel urethane foams.

Still another object of the invention is to provide an improved process for preparing urethane foams.

These and other objects of the invention will be apparent from the following description thereof.

It has now been discovered that the above-mentioned objects are accomplished when a phosphoris acid composition is reacted with an organic hydroxy compound in the presence of a solvent, the resulting reaction product is then reacted with an alkylene oxide to effect oxyalkylation thereof, and excess solvent and excess alkylene oxide are then separated from the oxyalkylated phosphorus compound. A stabilizing proportion of an epoxide capable of stabilizing the oxyalkylated phosphorus compound may be admixed therewith to permit storage of the oxyalkylated phosphorus compound for extended periods. The resulting oxyalkylated phosphorus compound, with or without the stabilizing epoxide, may be reacted with an organic isocyanate in the presence of a foaming agent and a catalyst to yield a urethane foam having markedly improved flame resisting properties.

More in detail, the phosphoric acid composition is any phosphoric acid having an equivalent of at least about 72 percent by weight of $P_2O_5$, and preferably between about 75 and about 85 percent by weight of $P_2O_5$. Such highly concentrated phosphoric acid reactants can readily be prepared by adding sufficient anhydrous $P_2O_5$ to commercially available phosphoric acid having $H_3PO_4$ concentrations in the range between about 75 and about 85 percent by weight. The term "phosphoric acid composition" used throughout the description and claims is intended to refer to phosphoric acid solutions containing a $P_2O_5$ equivalent of at least about 72 percent $P_2O_5$ by weight.

The organic hydroxy compound is any organic hydroxy compound containing between about three and about ten hydroxyl groups. It is preferred to employ polyhydric alcohols such as sorbitol, glycerol, pentaerythritol, dipentaerythritol, and tripentaerythritol. Other polyhydric alcohols which may be conveniently employed include sucrose, anhydroenneaheptitol, hexanetriol, trimethylol propane, trimethylol ethane, pyrogallol, mixtures thereof, and the like. In addition, any aminohydroxy compound having a functionality between about 3 and about 10 may be employed, such as monoethanolamine, diethanolamine, triethanolamine, mixtures thereof, and the like.

The proportions of organic hydroxy compound and phosphoric acid compound employed in preparing the oxyalkylated phosphorous compound are equivalent to a ratio of moles of hydroxyl groups in the organic hydroxy compound to moles of $H_3PO_4$ in the phosphoric acid composition in the range between about 0.5:1 and about 10:1, and is preferably between about 1:1 and about 3:1. However, larger proportions of organic hydroxy compound may be employed if desired.

The reaction of the phosphoric acid composition and organic hydroxy compound is preferably effected in the presence of a suitable solvent such as acetone, tetrahydrofuran, mixtures thereof and the like. Acetone and tetrahydrofuran are the preferred solvents since acetone acts with propylene oxide to form trimethyldioxolane, and since both acetone and tetrahydrofuran speed the rate of reaction by lowering the viscosity of the reaction mass. Any proportion of solvent may be employed that will give the desired viscosity properties to the reaction mass. Generally, a proportion of solvent equivalent to between about 0.5 and about 5 times the weight of phosphoric acid composition is employed, but greater or lesser proportions may be employed if desired.

When the phosphoric acid composition and organic hydroxy compound are reacted in the presence of a solvent at a temperature in the range between about 25 and about 110° C. for between about one-half and about five hours, a reaction product is obtained which includes mono- and disubstituted esters of phosphoric acid and organic hydroxy compound, unreacted organic hydroxy compound and phosphoric acid.

The resulting reaction product is oxyalkylated with any alkylene oxide capable of forming an oxyalkylated phosphorous compound. It is preferred to employ a lower alkylene oxide containing between about 2 and about 6 carbon atoms to prepare the oxyalkylated phosphorous compound, but aryl-alkyl oxides, cycloalkylene oxides and the like may also be employed. Typical examples of suitable oxides include ethylene oxide, propylene oxide, butylene oxide, isobutylene oxide, N-hexyl oxide, glycidol, epichlorohydrin, tetramethylene oxide, cyclobutylene oxide, cyclohexylene oxide, mixtures thereof, and the like.

Any proportion of alkylene oxide is employed that will yield an oxyalkylated product having a hydroxyl number in the range between about 30 and about 800. It is desirable to add sufficient alkylene oxide in order that a product of low acidity (an acid number of about 0.5 or less) is obtained at the end of the reaction.

The oxyalkylation reaction may be exothermic at the beginning and then heat must be supplied to maintain the reaction at the desired temperature. Oxyalkylation reaction temperatures in the range between about 20° and about 110° C., and preferably in the range between about 40° and between about 90° C. are employed. The reaction time is generally between about 2 and about 8 hours, but shorter or longer periods may be employed, depending on the proportions of reactants.

No catalyst is necessary in the oxyalkylation step due to the presence of phosphoric acid which has a catalytic effect on the reaction. However, if a product is desired having a hydroxy number lower than that obtained from the reaction without a catalyst, addition of a catalytic proportion of an acid catalyst and additional alkylene oxide will reduce the hydroxyl number of the product. The preferred acid catalyst is a Lewis acid catalyst such as boron trifluoride but other suitable catalysts include, but are not limited to, boron trichloride, aluminum chloride, titanium chloride, tin tetrachloride, ferric chloride and acidic clays such as Tonsil clay. Other suitable catalysts include inorganic acids such as sulfuric acid, hydrofluoric acid, and the like. The proportion of additional catalyst is generally in the range between about 0.1 and about 2 percent by weight of the additional alkylene oxide added.

During the oxyalkylation reaction the alkylene oxide reacts with the components of the initial reaction product to form a cooxyalkylated product having the desirable characteristics of the phosphoric acid composition and the organic hydroxy compound. The reaction product is predominantly an oxyalkylated organic phosphorous polyether polyol, which is referred to herein as an "oxyalkylated phosphorous compound."

The oxyalkylated phosphorous compounds produced as described herein are generally purified by distillation or otherwise to remove excess alkylene oxide, excess solvent and other impurities that may be present, such as trimethyldioxolane. Oxyalkylated phosphorous compounds prepared in accordance with this process have a relatively low viscosity and excellent physical properties which make them suitable for use in the preparation of polyurethane foams. If extended storage, for example, about one month or more, is contemplated prior to using the oxyalkylated phosphorous compound as a reactant in urethane foams or the like, it is highly advantageous to add a stabilizing proportion of a suitable stabilizing epoxide to the oxyalkylated phosphorous compound immediately after purification. Suitable stabilizing epoxides include limonene dioxide, vinylcyclohexene dioxide (sold under the trademark UNOX-206), dicyclodiepoxy carboxylate (sold under the trademark UNOX-201), mixtures thereof and the like. Without being bound by theory, it is believed that epoxides of this type do not act as water scavengers, but instead react with acidic phosphorous compounds formed by hydrolysis or other degradation processes. In addition, the stabilizing epoxide can also improve the properties of the resulting polyol by reducing the acid number thereof. The stabilizing proportion of stabilizer employed is any proportion capable of imparting the desired degree of stability to the oxyalkylated phosphorous compound. For example, a proportion of stabilizing epoxide which effects stabilization of the oxyalkylated phosphorous compound is between about 0.1 and about 2 percent by weight of the purified oxyalkylated phosphorous compound. Greater or lesser proportions of the stabilizer may be employed if desired.

The purified oxyalkylated phosphorus compound, when employed as a reactant in the preparation of rigid urethane foams, should have a hydroxyl number in the range between about 300 and about 800. When the oxyalkylated phosphorus compound is employed in the preparation of semi-rigid urethane foams, the hydroxyl number should be in the range between about 100 and 300. In the preparation of flexible urethane foams, the hydroxyl number of the oxyalkylated phosphorus compound should be in the range between about 30 and 100.

In the preparation of polyurethane foams from the oxyalkylated phosphorus compound of this invention, either the so-called "one shot method" or the "semiprepolymer technique" ("quasiprepolymer technique") may be employed.

Any organic polyisocyanate may be employed in the preparation of the polyurethane foams, including diisocyanates, triisocyanates, and polyisocyanates. Typical examples of suitable isocyanates include, but are not limited to, mixtures of isomers of tolylene diisocyanate which are readily available commercially, such as the 4:1 mixture of the 2,4- and 2,6-isomers, methylene-bis-(4-phenyl isocyanate), 3,3'-bitolylene-4,4'-diisocyanate, 3,3'-dimethoxy-4,4'-biphenylene diisocyanate, naphthalene-1,4-diisocyanate, hexamethylene diisocyanate, 1,4-phenylene diisocyanate, polymethylene polyphenyl isocyanate, mixtures thereof, and the like. For foams having superior flame retarding properties, polymethylene polyphenyl isocyanate is employed as the organic isocyanate. The amount of isocyanate employed in the preparation of the polyurethane foams should be sufficient to provide at least about 0.7 mole of NCO groups per mole of hydroxyl groups present in the oxyalkylated phosphorus compound, and in any other reactant or additive used to prepare the foam. A proportion of isocyanate in excess of about 1.25 NCO groups per hydroxyl group is operable, but the use of these large proportions is generally undesirable due to the high cost of the isocyanate compounds. It is preferable, therefore, to employ a proportion of isocyanate which provides between about 0.8 and about 1.15 moles of NCO groups per mole of hydroxyl groups present.

The urethane foams are prepared in the presence of a foaming agent and a reaction catalyst. The foaming agent employed may be any of these known to be useful for this purpose, such as water, the halogenated hydrocarbons, and mixtures thereof. Typical halogenated hydrocarbons include, but are not limited to monofluorotrichloromethane, difluorodichloromethane, 1,1,2-trichloro- 1,2,2-trifluoroethane, methylene chloride, chloroform, carbon tetrachloride, mixtures thereof, and the like. The amount of blowing agent employed may be varied within a wide range. Generally, however, the halogenated hydrocarbons are employed in an amount from 1 to 50 parts by weight per 100 parts by weight of the oxyalkylated phosphorus compound of the present invention, and generally the water is employed in an amount of from 0.1 to 10 parts by weight per 100 parts by weight of the oxyalkylated phosphorus compound of the present invention.

The urethane foams are prepared in the presence of a catalytic amount of a reaction catalyst. The catalyst employed may be any of the catalysts known to be useful for this purpose, including tertiary amines and metallic salts. Typical tertiary amines include, but are not limited to, N-methyl morpholine, N-hydroxyethyl morpholine, triethylene diamine, triethylamine, trimethylamine and mixtures thereof. Typical metallic salts include, for example, the salts of antimony, tin and iron, e.g., dibutyltin dilaurate, stannous octoate, etc., and mixtures thereof. Generally, the catalyst is employed in an amount from 0.1 to 2.0 percent by weight based on the oxyalkylated phosphorus compound of the present invention, but any catalytic proportion capable of accelerating the reaction may be employed.

The polyurethane foams of the present invention may be prepared directly by the reaction between the oxyalkylated phosphorus compound and organic polyisocyanate in the presence of a foaming agent and reaction catalyst. Optionally, various additives may be employed in the preparation of the polyurethane foams in order to achieve particular properties. Typical additives include, but are not limited to monocarboxylic acids, polycarboxylic acids, polyesters, monohydroxy compounds, polyhydroxy compounds, mixtures thereof and the like.

It is preferred in the preparation of the polyurethane foams of the present invention to employ minor amounts of a surfactant in order to improve the cell structure of the polyurethane foam. Typical of such surfactants are the silicone oils and soaps. Generally up to 2 parts by weight of the surfactant is employed per 100 parts of oxyalkylated phosphorus compound.

Various additives can be employed which serve to provide different properties, e.g., fillers, such as clay, calcium sulfate, or ammonium phosphate may be added to lower cost. Ingredients such as dyes may be added for color, and glass fibers, asbestos, or synthetic fibers may be added for strength. In addition, plasticizers, deodorants, and anti-oxidants may be added.

The process of the present invention will be more readily apparent from a consideration of the following illustrative examples. All parts and percentages are by weight unless indicated otherwise.

EXAMPLE 1

To 120 g. sorbitol was added 187 g. of 105 percent phosphoric acid. The mixture was heated to 105° C. to melt and react the sorbitol. Propylene oxide (968 g.) was added slowly at 80–100° C. When the uptake of propylene oxide was no longer apparent 2 ml. of boron trifluoride etherate was added. After the exotherm was over, the mixture was allowed to cool gradually. The volatiles were stripped off at 60° C. and at reduced pressure. There was obtained 1209 g. of product. After treatment with calcium hydroxide to remove $BF_3$ the product had an apparent pH of 2.9 acid number of 2.1 and a hydroxyl number of 405.

EXAMPLE 2

A mixture of 466.5 g. of 105 percent phosphoric acid and 346 g. of sorbitol was heated at 100° C. until all sorbitol melted. To this was added 2204 g. of propylene oxide at a temperature of 85–110° C. The mixture was held at reflux for several hours and then stripped of volatiles at reduced pressure giving 2794 g. of product having hydroxyl number of 467 and acid number of 0.25.

EXAMPLE 3

To a mixture of 490 g. of 100 percent phosphoric acid and 720 g. of tetrahydrofuran was added 1520 g. of propylene oxide at temperatures up to 90° C. Fractionation of the volatiles indicated that 1.2 mole tetrahydrofuran had reacted per mole phosphoric acid. The product had hydroxyl number 326, apparent pH 4.65 and acid number 0.16.

EXAMPLE 4

A mixture of 698 g. of 105 percent phosphoric acid, 354 g. of sorbitol and 750 g. of dioxane were heated at 100° C. for two hours. The mixture was cooled and 2800 g. of propylene oxide was added at temperatures of 30 to 50° C. The mixture was held at 60° C. until the reaction was essentially complete. Stripping at reduced pressure gave 3747 g. of polyol having hydroxyl number 440, apparent pH 4.3 and acid number 0.23.

EXAMPLE 5

A mixture of 700 g. of 105 percent phosphoric acid and 500 g. of sorbitol was heated at 85 to 105° C. for one hour. A total of 3600 g. of propylene oxide was added over a 11½ hour period maintaining a temperature of 65–90° C. The reaction mixture was heated at reflux (70° C.) for 7 hours and then stripped of volatiles at reduced pressure. The product weighed 4,338 g. and had hydroxyl number 442, apparent pH 4.3 and acid number 0.22. The product was stibilized by addition of 0.5 percent vinylcyclohexene dioxide and then had hydroxyl number 441, apparent pH 5.0, acid number 0.11 and contained 5.2 percent phosphorus.

EXAMPLE 6

A mixture of 700 g. of 105 percent phosphoric acid and 350 g. of sorbitol was heated to a temperature of 119° C. The mixture was cooled and 350 g. of acetone was added. To this solution was added 3300 g. of propylene oxide over a 4½ hour period maintaining the temperature between 40 and 60° C. The mixture was heated at reflux for 5 hours and then stripped of volatiles at reduced pressure. Fractionation of the condensate gave a 20 percent recovery of free acetone and a 37 percent recovery of acetone as 2,2,4-trimethyldioxolane. The remaining 43 percent of the acetone remained in the polyol in a combined state. The product had hydroxyl number 413, apparent pH 5.1 and acid number 0.07.

EXAMPLE 7

A 10 gallon glass-lined reactor was purged with nitrogen and charged with 6.25 lb. of sorbitol. The reactor was heated to 116° C. to melt the sorbitol. The material was cooled to 98° C. and 8.75 lb. of dioxane was added. The slurry was cooled to 85° C. and 12.5 lb. of 105 percent phosphoric acid was added and the mixture was agitated at 85–90° C. for ½ hour. Propylene oxide (52.5 lb.) was fed into the reactor under nitrogen pressure over a 1½ hour period maintaining the temperature at 80–90° C. The reaction mixture was held at 70° C. for an additional 17 hours. The product was stripped of volatiles by passing twice through a falling film evaporator at reduced pressure. The product had apparent pH 3.4 and and acid number 0.59. This material when blended with two other batches had apparent pH 3.7 and acid number 0.39. After addition of 0.5 percent Unox 206 and a short storage period the product had hydroxyl number 450, apparent pH 5.1, acid number 0.18, viscosity 2,620 c.p.s. at 27° C. and contained 6.9 percent phosphorus.

EXAMPLE 8

To a phosphate polyol (similar to that produced in Example 7) with apparent pH 3.3 and acid number 0.8 was added 1.0 percent Unox 206. After 7 days the product had apparent pH 4.7 and acid number 0.16.

EXAMPLES 9–10

An oxyalkylated phosphorus compound was prepared in accordance with the procedure of Example 6. A portion of this oxyalkylated phosphorus compound was admixed with 1 percent of dicyclodiepoxy carboxylate. The pH and acid number of the resulting mixture were determined periodically and the results obtained are presented below in Table I as "Example 9."

A second portion of the oxyalkylated phosphorus compound was admixed with 1 percent of vinylcyclohexene dioxide, and the pH and acid number of the resulting mixture were determined periodically. The results are presented below in Table I as "Example 10."

For purposes of comparison a third portion of the oxyalkylated phosphorus compound was stored under the same conditions as Examples 9 and 10 except no stabilizer was added thereto. The pH and acid number of this portion were determined periodically, and the results are set forth below in Table I as "Control."

A fourth portion of the oxyalkylated phosphorus compound was stored under an atmosphere of nitrogen in a sealed container. The pH and acid number of this portion is set forth in Table I under "Sealed Container."

EXAMPLE 11

An oxyalkylated phosphorus compound prepared from sorbitol, 105 percent phosphoric acid and propylene oxide in a manner similar to the procedure of Example 6 was admixed with 1 percent limonene dioxide and the resulting mixture was stored. The pH and acid number were determined periodically, and the results are presented below in Table II.

For purposes of comparison, a portion of the same oxyalkylated phosphorus compound was stored without adding in the stabilizer. The pH and acid number were determined periodically, and the results are presented below in Table II in the column after "None."

For purposes of further comparison another portion of the oxyalkylated phosphorus compound was stored under an atmosphere of nitrogen in a sealed container. The pH and acid number after 59 days were determined, and the results are presented below in Table II in the column after "None (sealed under $N_2$)."

TABLE II.—EFFECT OF LIMONENE DIOXIDE ON STABILITY OF OXYALKYLATED PHOSPHORUS COMPOUND

| Additive | Days from Test Start | | | | | | | | | |
|---|---|---|---|---|---|---|---|---|---|---|
| | 0 | | 3 | | 11 | | 39 | | 59 | |
| | pH | Acid No. | pH | Acid No. | pH | Acid No. | pH | Acid No. | pH | Acid No. |
| 1% Limonene Dioxide | | | 5.1 | 0.12 | 5.4 | 0.07 | 5.05 | 0.10 | 4.95 | 0.12 |
| None | 4.55 | 0.11 | 4.6 | 0.12 | 4.4 | 0.16 | 3.85 | 0.21 | 3.8 | 0.25 |
| None (sealed under $N_2$) | | | | | | | | | 3.9 | 0.18 |

These results show that there was a significant decrease in the pH and a significant increase in the acid number of the "Control" sample and that storing the oxyalkylated phosphorus compound under nitrogen had little effect upon controlling the stability of the pH and acid number. In marked contrast, the addition of only TABLE I.—EFFECT OF VARIOUS EPOXIDES ON STABILITY OF OXYALKYLATED PHOSPHORUS COMPOUNDS

| Test | Days from Test Start | | | | | | | | | |
|---|---|---|---|---|---|---|---|---|---|---|
| | 0 | | 1 | | 18 | | 26 | | 34 | |
| | pH | Acid No. | pH | Acid No. | pH | Acid No. | pH | Acid No. | pH | Acid No. |
| Example 9 with dicyclodiepoxy carboxylates | | | 5.0 | 0.06 | 4.90 | 0.06 | 4.7 | 0.08 | 3.9 | 0.15 |
| Example 10 with vinylcyclohexanedioxide | | | 5.2 | 0.07 | 5.30 | 0.07 | 5.0 | 0.06 | 4.9 | 0.07 |
| Control | 4.9 | 0.10 | 4.8 | 0.08 | 2.85 | 1.12 | 2.3 | 5.32 | | |
| Sealed Control | | | | | | | 3.8 | 0.20 | | |

These results show that the addition of stabilizing epoxides of the type used in Examples 9 and 10 markedly inhibit a reduction in the pH and an increase in the acid number after storage for a period of 34 days. In contrast, the "Control" sample has a significant decrease in the pH (from 4.9 to 2.3) and a marked increase in the acid number (from 0.10 to 5.32) after 26 days of storage. Although the nitrogen atmosphere in the "Sealed Control" did have some effect on inhibiting the increase in acid number after 26 days, nevertheless the pH dropped from 4.9 to 3.8.

1 percent limonene dioxide showed virtually no change in the acid number or pH after storage of 59 days.

EXAMPLES 12–19

A group of urethane foams was prepared under various conditions from the oxyalkylated phosphorus compound prepared in Examples 1–4. Presented below in Table III are the proportions of ingredients used in preparing the foams. Table IV shows the properties of the foams recited in Table III.

TABLE III.—FOAM FORMULATIONS

| Example No. | Polyol From— | Parts | Polyether (A) | Silicone Oil Emulsifier | Catalysts | | | R-11 (E) | PAPI (F) | Cream Time | Rise Time | Tack Free Time |
|---|---|---|---|---|---|---|---|---|---|---|---|---|
| | | | | | DMEA (B) | D-22 (C) | TMBD (D) | | | | | |
| 12 | Example 1 | 100 | | 1.5 | 1.0 | .75 | | 32 | 104.2 | | | |
| 13 | do | 80 | 20 | 1.5 | 1.25 | .75 | | 32 | 100.4 | | | |
| 14 | do | 50 | 50 | 1.5 | 1.25 | .75 | | 32 | 103.4 | | | |
| 15 | Example 2 | 400 | | 8.0 | | | 4.0 | 136 | 499.2 | :35 | 2:20 | 2:50 |
| 16 | do | 400 | | 10 | | | 6.0 | 136 | 499.2 | :15 | 1:30 | 1:21 |
| 17 | Example 3 | 60 | 40B | 2.0 | | | 1.5 | 29 | 95 | :20 | 1:50 | 2:07 |
| 18 | Example 4 | 400 | | 8.0 | | | 4.5 | 129.6 | 448.4 | :27 | 1:20 | 1:40 |
| 19 | do | 400 | | 8.0 | | | 5.0 | 132 | 1 (502) | :15 | 2:03 | 3:45 |

[1] Quasi Prepolymer with toluene diisocyanate: 4.5 equivalents of toluene diisocyanate: 1.0 equivalents of oxyalkylated phosphorus compound.
(A) Polyether = reaction product of methyl glucoside, glycerol and propylene oxide.
(B) DMEA = dimethyl ethanolamine.
(C) D-22 = dibutyltin dilaurate.
(D) TMBD = tetramethyl butylene diamine.
(E) R-11 = trichloromonofluoromethane.
(F) PAPI = Trademark for a brand of polymethylene polyphenylisocyanate.

TABLE IV.—FOAM EVALUATIONS

| Example No. | Foam Density, p.c.f. | Compressive Strength, p.s.i. | K Factor Initial | K Factor Aged[3] | Flame Test Initial | Flame Test Aged |
|---|---|---|---|---|---|---|
| 12 | 2.0 | 16.8 | | | SE[1] | SE |
| 13 | 2.1 | 30.0 | | | | SE |
| 14 | 2.0 | 17.2 | | | SE | SE |
| 15 | 1.90 | 25.7 | .255 | .306 | SE | SE |
| 16 | | | .161 | .188 | SE | SE |
| 17 | 2.0 | 32.0 | 0.119 | .150 | NB[2] | NB |
| 18 | 2.02 | 32.5 | 0.134 | | NB | NB |
| 19 | 2.2 | 26.9 | 0.121 | | SE | SE |

[1] SE=self-extinguishing in accordance with ASTM 1692-59T.
[2] NB=non-burning in accordance with ASTM 1692-59T.
[3] Aged=stored for about 10 days at 140° F.

We claim:
1. The process for stabilizing the pH of a solution of an oxyakylated phosphorus compound prepared by reacting a phosphoric acid composition having a $P_2O_5$ concentration of at least about 72 percent by weight with an organic hydroxy compound containing between about 3 and about 10 hydroxyl groups selected from the group consisting of sorbitol, glycerol, pentaerythritol, dipentaerythritol, tripentaerythritol, sucrose, anhydroenneaheptitol, hexanetriol, trimethylol propane, trimethylol ethane, pyrogallol, and mixtures thereof, wherein the proportion of organic hydroxy compound is equivalent to a ratio of moles of hydroxyl groups therein to moles of $H_3PO_4$ in said phosphoric acid composition of between about 0.5:1 and about 10:1, said reaction being effected at a temperature in the range between about 25 and about 110° C. in the presence of a solvent selected from the group consisting of acetone, tetrahydrofuran, dioxane, and mixtures thereof, and reacting the resulting mixture with sufficient alkylene oxide to yield an oxyalkylated phosphorus compound having a hydroxyl number in the range between about 30 and about 800, and recovering the solution of oxylalkylated phosphorus compound produced thereby, said process comprising adding to the resulting solution of oxyalkylated phosphorus compound a pH stabilizing proportion of an epoxide selected from the group consisting of limonene dioxide, vinylcyclohexene dioxide, dicyclodiepoxy carboxylate, and mixtures thereof.

2. The composition produced by the process of claim 1.
3. The process of claim 1 wherein said alkylene oxide is selected from the group consisting of propylene oxide, ethylene oxide, and mixtures thereof.
4. The composition produced by the process of claim 3.
5. The process of claim 3 wherein said organic hydroxy compound is sorbitol.
6. The composition produced by the process of claim 5.
7. The process of claim 1 wherein said stabilizing proportion is between about 0.1 and about 2 percent by weight of the oxyalkylated phosphorus compound.
8. The composition produced by the process of claim 7.

References Cited

UNITED STATES PATENTS

| | | | |
|---|---|---|---|
| 3,079,418 | 2/1963 | Pumpelly | 260—989 |
| 2,842,462 | 7/1958 | Haas et al. | 260—978 XR |
| 3,251,828 | 5/1966 | Lutz. | |

FOREIGN PATENTS 348,284  9/1960  Switzerland.

CHARLES B. PARKER, *Primary Examiner.*

ANTON H. SUTTO, *Assistant Examiner.*

U.S. Cl. X.R.

260—2.5, 953, 978, 989, 980